(12) United States Patent
Barrick et al.

(10) Patent No.: US 6,844,849 B1
(45) Date of Patent: Jan. 18, 2005

(54) CIRCULAR SUPERDIRECTIVE RECEIVE ANTENNA ARRAYS

(75) Inventors: Donald E. Barrick, Redwood City, CA (US); Peter M. Lilleboe, San Jose, CA (US)

(73) Assignee: Codar Ocean Sensors, Ltd., Los Altos, CA (US)

( * ) Notice: Subject to any disclaimer, the term of this patent is extended or adjusted under 35 U.S.C. 154(b) by 0 days.

(21) Appl. No.: 10/617,277

(22) Filed: Jul. 10, 2003

(51) Int. Cl.[7] .............................................. H01Q 3/24
(52) U.S. Cl. ...................................... 342/372; 342/363
(58) Field of Search ................................ 342/165, 174, 342/363, 365, 368, 372

(56) References Cited

U.S. PATENT DOCUMENTS 5,530,449 A * 6/1996 Wachs et al. ............... 342/174
5,920,286 A * 7/1999 Mohebbi ..................... 342/383

* cited by examiner

*Primary Examiner*—Dao Phan
(74) *Attorney, Agent, or Firm*—Fulbright & Jaworski LLP

(57) ABSTRACT

Systems and methods are described for circular superdirective receive antenna arrays. A method includes calculating an minimum array efficiency of the superdirective circular receive array, calculating a maximum superdirective gain of the superdirective circular receive array, determining an amplitude weight or a phase weight for an array element in the superdirective circular receive array based on the minimum array efficiency and the maximum superdirective gain, and determining number of array elements in the superdirective circular receive array and a radius of the superdirective circular receive array.

21 Claims, 3 Drawing Sheets

$$S_A = V_1 - \frac{V_2 + V_3}{2}$$

$$S_B = V_2 - V_3$$

$$S_C = V_1 + V_2 e^{+j2\pi/3} + V_3 e^{-j2\pi/3}$$

CIRCULAR SUPERDIRECTIVE RECEIVE ANTENNA ARRAYS

BACKGROUND OF THE INVENTION

1. Field of the Invention

The invention relates generally to the field of radars. More particularly, the invention relates to radar receive antenna arrays. Specifically, a preferred implementation of the invention relates to an optimized design for radar receive antenna arrays.

2. Discussion of the Related Art

MF (medium frequency)/HF (high frequency)NIHF (very high frequency) radars and radios remain in demand even with the advent of satellites that extend the range of communication to global scales. HF signals have the advantage of spanning distances beyond the horizon limits of UHF and higher-frequency signals. Two modes account for this. Reflection of HF signals from the ionosphere is called the skywave mode, and permits radio signals to traverse half way around the world. In the surface-wave mode, the spherical earth diffracts vertically polarized signals beyond the visible horizon—even in the absence of an atmosphere or ionosphere. For surface wave propagation, the sea is better than land because of its higher conductivity. The drawback of MFIHFIVHF systems is the large antenna size needed for high gain and/or efficiency. High gain is achieved with conventional antenna design by requiring aperture sizes many wavelengths. For example, when ships are to be detected beyond the horizon by an HF surface wave radar, best results are obtained if a receive antenna can maximize the echo energy captured from a bearing point on the sea surface, thereby realizing a high directive gain with a narrow beam focused along that bearing. At 5 MHz, for example, the wavelength is 60 meters. To achieve 20 dB directive gain, a linear monopole array has at least 32 elements spaced 30 meters apart, spanning one kilometer and achieving an azimuth beamwidth of about 4° (although the elevation beamwidth is 45°). If element amplitude tapering is employed to reduce sidelobes that may be unwanted, then even more elements over a longer aperture are needed to achieve the same directive gain. Mathematical solutions have shown that one can form very narrow beamed patterns with closely spaced array elements by employing phasings that nearly cancel the incoming signals after beamforming. This concept is known as superdirective gain—or often just supergain, which is a type of directive gain. If the pattern beamwidth is small and sidelobe levels are low, then its directive gain is large. However, the efficiency of these arrays is low. That is, the summed output signal after applying the element phasings is much smaller than the signal into each element. Thus, while the directive gain is high, the power gain is low. This has been the primary source of criticism and lack of acceptance of superdirective arrays in practice. Another case occurs where near-cancellation is desirable in HF surface-wave radars because overhead ionospheric layers occasionally reflect—like a mirror—the signal back to the radar. This occurs at ranges from 100 to 350 km, depending on the layer height. These very intense echoes destroy the ability to see surface targets at the same ranges as the layer heights. Although many receive antenna systems employ vertical dipole or monopole antennas that theoretically have an overhead null, in practice this is not nearly enough to eliminate all vestiges of the intense overhead echo. Another undesirable feature of conventional phased array antennas is the variation and degradation of pattern characteristics as one steers the beam to different bearings. In linear phased arrays, for example, steering more than 45° from the optimal broadside direction results in unacceptable main-beam broadening and increase in sidelobe levels. As shown in U.S. Pat. No. 5,361,072, incorporated herein by reference in its entirety, single antenna elements can be made more compact and less costly at the expense of efficiency. A design criterion was developed and revealed to guide the size reduction so that external noise always dominated internal noise. Optimal signal-to-noise ratio (SNR) was thereby always ensured. However, such techniques were applied to single antenna elements only, and an implementation of the theory has not been realized for antenna arrays. Accordingly, the requirements of a compact antenna array that possesses the signal-to-noise ratio of the arrays of the prior art (or similar thereto) have not been fully met. What is needed is a solution that simultaneously addresses these requirements.

SUMMARY OF THE INVENTION

There is a need for the following embodiments. Of course, the invention is not limited to these embodiments. According to one aspect of the invention, a method includes calculating an minimum array efficiency of the superdirective circular receive array, calculating a maximum superdirective gain of the superdirective circular receive array, determining an amplitude weight or a phase weight for an array element in the superdirective circular receive array based on the minimum array efficiency and the maximum superdirective gain, and determining number of array elements in the superdirective circular receive array and a radius of the superdirective circular receive array.

According to another aspect of the invention, a method for calculating an overhead null in synthesized patterns of received signals of a circular array includes receiving signals $V_1$, $V_2$, and $V_3$, and calculating the synthesized patterns in accordance with the equations $$S_A = V_1 - \frac{V_2 + V_3}{2}$$
$$S_B = V_2 - V_3$$
$$S_C = V_1 + V_2 e^{+j2\pi/3} + V_3 e^{-j2\pi/3},$$

where $S_A$, $S_B$, and $S_C$ are the synthesized patterns.

According to yet another aspect of the invention, an apparatus for an antenna system includes a plurality of dipole elements located in a circular arrangement of a radius that is less than a detected wavelength to receive a plurality of analog signals, an analog-to-digital converter to convert the plurality of analog signals to a plurality of digital signals, a memory storage to store calculated amplitude and phase weights, a computer to calculate amplitude and phase corrections, a processor to apply calculated weights and amplitude and phase corrections to the plurality of digital signals, and an output device which produces at least one output signal from the plurality of digital signals.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation.

BRIEF DESCRIPTION OF THE DRAWINGS

The drawings accompanying and forming part of this specification are included to depict certain aspects of the invention. The invention may be better understood by reference to one or more of these drawings in combjination with the description presented herein.

DESCRIPTION OF ILLUSTRATIVE EMBODIMENTS

The invention and the various features and advantageous details thereof are explained more fully with reference to the nonlimiting embodiments that are illustrated in the accompanying drawings and detailed in the following description. Various substitutions, modifications, additions and/or rearrangements within the spirit and/or scope of the underlying inventive concept will become apparent to those of ordinary skill in the art from this disclosure.

Techniques of the present disclosure can include providing a compact, circular array of antenna elements that realizes any directive gain.

Techniques of the present disclosure can also include maximizing compaction of an antenna array while maintaining the same signal-to-noise ratio.

Phasing schemes like the ones disclosed here supply additional overhead nulling while offering minimal to no sensitivity penalty to desired signals from elsewhere. In this sense, it can be considered an improvement to the superdirective class of arrays discussed above.

When internal noise dominates, as at microwave frequencies, low antenna efficiency and poor noise figure results in receive systems having low signal-to-noise ratios. Below UHF, however, ultimate receive antenna efficiency is not required, because external noise from atmospheric and galactic sources dominates internal noise. Less efficiency in the antenna and receiver front end means the desired signal is lower, but so also is the external noise. When efficiency drops to the point where internal noise dominates, then signal-to-noise ratio begins to be negatively impacted.

The array geometries and methodologies revealed here completely overcome this limitation of present practice. By equi-angular arrangement of any odd number of identical omni-directional elements (e.g., dipoles), a pattern may be produced whose beamwidth and sidelobe structure remain absolutely invariant of any angle to which one desires to steer the beam over the entire 360° bearing space. This pattern invariance does not occur for an even number of N elements on a circle; in that case, only N-fold angular symmetry can be obtained.

The invention has application to both radio receive systems as well as HF/VHF radars. An example of the latter case has been the proliferation of coastal HF surface wave radars that map ocean currents, wavefields, and detect ships, all beyond the visible horizon. The limitation of conventional HF receive antenna technology (e.g., large phased arrays) has been their size. This has led to non-proportionately increased initial capital costs, operating costs, as well as strong resistance to permitting such obtrusive structures on pristine, ecologically sensitive, and/or heavily populated coastal locations. This is an utilitarian motivation that has led to the inventions revealed in the present patent.

Figure 1:
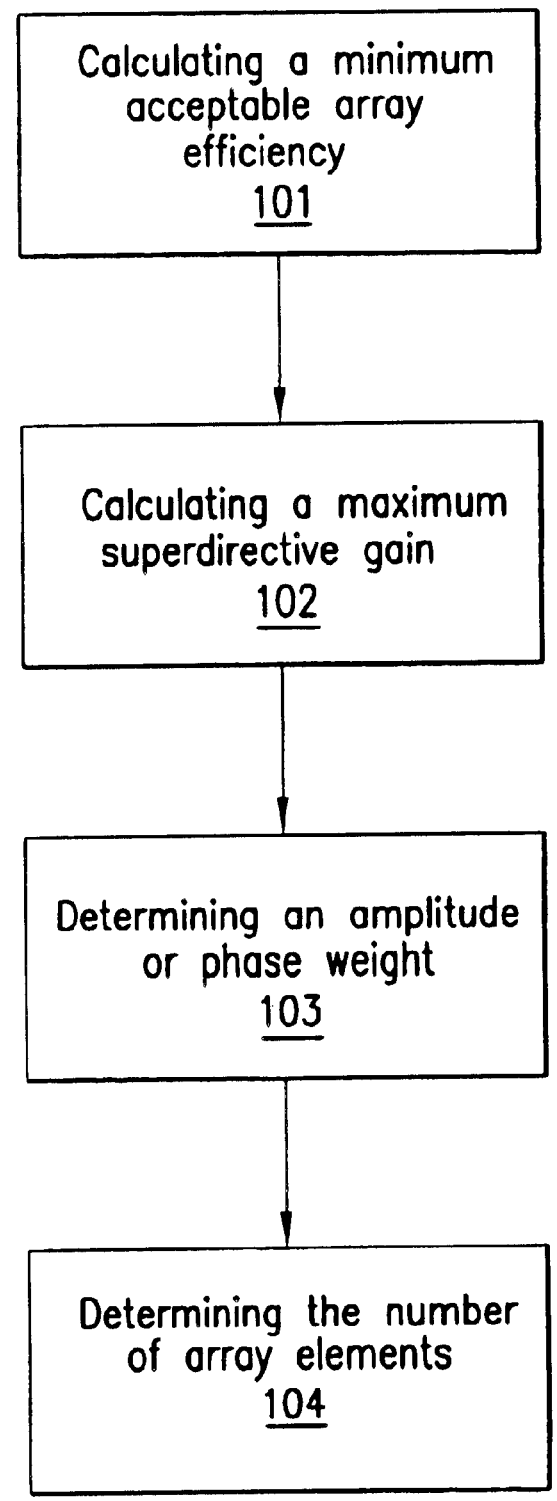
FIG. 1 is a flowchart illustrating the steps for designing a circular superdirective receive antenna array, in accordance with an embodiment of the invention.

FIG. 1 is a flowchart illustrating the steps for designing a circular superdirective receive antenna array, in accordance with an embodiment of the invention. To design the receive array, a desired minimum acceptable array efficiency of the superdirective circular receive array is calculated 101. A maximum superdirective gain of the superdirective circular receive array is then calculated 102. Once the minimum efficiency 101 and the maximum superdirective gain 102 have been calculated, an amplitude weight or a phase weight for an array element in the superdirective circular receive array is determined 103. The amplitude/phase weight may be based on the minimum array efficiency and the maximum superdirective gain. Once the amplitude/phase weight(s) 103 have been determined, the number of array elements in the superdirective circular receive array and a radius of the superdirective circular receive array may be determined 104. These steps are discussed in more detail in the following sections.

Advantages of the present invention include a focus on reducing the size and cost of conventional HF/VHF receive antenna arrays by disclosing an alternative, compact array system that has the same directive gain and achieves the same signal-to-noise ratio as the former conventional linear arrays. Also, it will become apparent that any odd number of antenna array elements symmetrically arranged on a circle produce a pattern that is invariant with steer angle over 360°.

A principal obstacle overcome by the present invention is the size and cost of conventional MF/HFNVHF receive antenna arrays that has been a severe handicap to their widespread acceptance in radar and radio systems.

It would be highly useful to have a compact antenna that could form the same narrow beam with high directive gain as a large phased array. Or alternatively, to point a null in an undesired direction while having a chosen pattern for angular sectors of interest, also with a compact circular rather than large linear array. The present invention provides techniques that allow an optimal efficiency upon receiving a signal so that additional efficiency does not improve the signal-to-noise ratio or the radar sensitivity.

Superdirective Optimization Procedure

In one embodiment, a first step is to determine the optimal weights for the selected odd number of antenna elements arranged in a circle. "Weights" mean the amplitudes and phases to be set into each element's signal before sunmming to produce a desired beam pattern. In a conventional, linear HF phased array, for example, the phases determine the beam direction, and the amplitudes control the sidelobe level. Harrington outlines a general procedure suitable for this purpose. (See Field Computation by Moment Methods, MacMillan Co.: New York, Chapter 10, which is incorporated by reference in its entirety) Other procedures are utilized and applied here to elements arranged at equal angular steps on a circle. An example is given below for perfect antenna patterns for each of the array elements.

A general quantity to be maximized is the antenna directive gain. This is defined as:

$$G(\vartheta_o, \varphi_o) = \frac{P(\vartheta_o, \varphi_o)}{\int_0^{2\pi} d\varphi \int_0^{\pi} d\vartheta \sin(\vartheta) P(\vartheta, \varphi)} \quad \text{(Eq. 1)}$$

where $G(\vartheta_o, \varphi_o)$ is defined as the directive gain (dimensionless), to be maximized in the desired direction $\vartheta_o, \varphi_o$, where angles are expressed in a standard spherical coordinate system. The quantity $P(\vartheta, \varphi)$ is the far-field power in any arbitrary units. Normally, the far-field power for an array is given by:

$$P(\vartheta, \varphi) = \left| \sum_{n=1}^{N} w_n g_n(\vartheta, \varphi) \right|^2 = |[w_n][g_n(\vartheta, \varphi)]^T|^2 \quad \text{(Eq. 2)}$$

where $w_n$ is the amplitude/phase weighting for the n-th element, and $g_n(\vartheta, \varphi)$ is the complex far-field radiation in direction $\vartheta, \varphi$ produced by the n-th element as determined by its geometrical location with respect to a local origin for the array. The matrices $[w_n]$ and $[g_n(\vartheta, \varphi)]$ above are considered row vectors, with superscript "T" denoting a complex conjugate transpose.

As an optimization problem, the directive gain can be considered to be the solution to an eigen-analysis problem with an arbitrary far-field directive gain function $\tilde{G}(\vartheta, \varphi)$ with arbitrary weights $[\tilde{w}_n]$ The corresponding, arbitrary far-field power function is now shown as:

The product of the inner vectors above is a square N×N Hermitian matrix. The weights $\tilde{w}_n$ are to be selected so that the arbitrary directive gain function is maximized. This arbitrary gain function may be represented by:

$$\tilde{G}(\vartheta_o, \varphi_o) = \frac{[\tilde{w}_n]^T [N_{m,n}(\vartheta_o, \varphi_o)][\tilde{w}_n]}{[\tilde{w}_n]^T [D_{m,n}][\tilde{w}_n]} \quad \text{(Eq. 4)}$$

where $$N_{m,n}(\vartheta_o, \varphi_o) = [g_m(\vartheta_o, \varphi_o)]^T [g_n(\vartheta_o, \varphi_o)] \quad \text{(Eq. 5)}$$

and $$D_{m,n} = \int_0^{2\pi} d\varphi \int_0^{\pi} d\vartheta \sin(\vartheta) N_{m,n}(\vartheta, \varphi) \quad \text{(Eq. 6)}$$

and $N_{M,N}$ and $D_{M,N}$ are both hermitian matrices. Eq. 4 is another way to express eq. 2 before it is optimized. Cast in the above form, one differentiates $\tilde{G}(\vartheta_o, \varphi_o)$ with respect to each of the arbitrary weights $\tilde{w}_n$, and sets the resulting equations to zero. The slopes represented by the derivatives are zero at the function maximum, and this therefore optimizes the resulting weights to provide maximum directive gain. The system of equations to be solved in matrix form becomes:

$$[N_{m,n}][w_n] = G_o[m,n][w_n] \quad \text{(Eq. 7)}$$

where $w_n$ now represents the "optimal" weights based on solution of the above equation (instead of before, where $\tilde{w}_n$ referred to any arbitrary weights). Also, $G_o$ is the desired, optimal directive gain in the direction $\vartheta_o, \varphi_o$, after one sets the weights $w_n$ on the antenna array outputs. The weights are applied to steer the beam to any desired direction in three-dimensional space.

The above matrix equation system is a classic eigenvalue problem, with one non-zero eigenvalue which is the maximum gain $G_o$. The optimal weights (i.e., amplitudes and phases) are referred to as the eigenvector corresponding to the non-zero eigenvalue $G_o$. Solutions of eigenvalue problems like this are available in any standard mathematical subroutine libraries, like commercially available MATLA™ ((The MathWorks, Inc.; Natick, MA) used for the examples here) or Mathematica™ (Wolfram Research, Inc.; Champaign, IL).

To relate this to a circular array with idealized short vertical dipole elements, the far-field complex radiation function is assumed to be $g_n(\vartheta, \varphi)$ in the direction $(\vartheta, \varphi)$ for the n-th element on the circle. The array starts with the n=0 element falling on the x-axis and go up to N, where N is an even integer so that the total number of elements is odd, i.e., N+1. With the origin at the center of the circle, this is given by:

$$g_n(\vartheta, \varphi) = \sin(\vartheta) e^{ikd\sin(\vartheta)\cos\left(\varphi - \frac{2n\pi}{N+1}\right)} \quad \text{(Eq. 8)}$$

where $\vartheta = 0$ is the upward direction of the dipole vertical axis and ($\varphi = 0$) corresponds to the direction along the x-axis. The elements are spaced in radians counterclockwise around the circle of radius d, and the radio wave number is given by $$k = \frac{2\pi}{\lambda}$$

where $\lambda$ is the wavelength.

If the pattern of an individual n-th array element is not the idealized form represented by the above equation, it can be measured as a function of $\vartheta, \varphi$ (or actually, just $\varphi$ around the horizon plane), and this can be substituted for the above expression. This would be done with all of the array elements in place on the circle, in order to account for mutual interactions among them. This is especially important when they are closely spaced, because the mutual interaction becomes significant in that case, and will be accounted for in the measurement process.

A beneficial feature of superdirective patterns calculated by the above method is their insensitivity to frequency as the element spacing from center (the circle radius) becomes less than a quarter wavelength. In other words, the pattern stays the same. This is not true of a conventional linear phased array whose elements are nearly always spaced a half wavelength apart: in that case, the pattern gain and beamwidth vary directly with the frequency.

In an embodiment of the present invention, the consequence of making the antenna smaller (or reducing the frequency for a fixed size) is not felt on the directive gain or antenna pattern—it impacts the array efficiency, which is dealt with in the next section.

Finally, note that the pattern and directivity for an odd number of elements on the circle is substantially invariant with steer direction. In other words, when one uses the above procedure to find and apply the required weights to steer to a given direction, the pattern is substantially the same at each and every angle, not just multiples of the array angle symmetry.

Designing an Array to Realize a Given Array Efficiency

As one moves elements closer together by decreasing the radius of the array circle, the efficiency of the array decreases while the pattern and directive gain remain the same. The decrease in efficiency is understood in the following way. The solution of the above equations for optimal weights reveals that the array signal sum—after weighting—tends to nearly cancel the signals arriving from all directions. The differences among signals on the array elements tends to zero as the array size decreases because they sample over a smaller fraction of the incoming sinusoidal radio waveform. Even though a signal's sum arriving in the lobe of the synthesized array pattern will be stronger than the summed signals from other directions, it is still much weaker than the signals impinging on the individual elements before weighting and summing.

On the other hand, noise below UHF in radio/radar receivers may come from outside the system. Such noise may be due to atmospheric sources (thunderstorms around the world) and cosmic sources. At 10 MHz, for example, this external noise is typically 55 dB (nearly six orders of magnitude in power) greater than internal receiver noise that dominates at microwave frequencies. This "external noise" is in reality a multitude of uncorrelated, random signals arriving from all directions. Thus, as the array size decreases causing desired summed target signals to weaken, so also does external noise diminish in the same proportion. Thus, signal-to-noise ratio remains the same. Only when external noise falls so low that internal (front-end receiver) noise dominates does one incur a penalty of diminution of SNR. A design objective of the present invention is to provide how one may select the minimum efficiency so that one is sure that external noise will dominate, while achieving maximum compactness and hence lowest cost.

This process may be illustrated with the following example. Suppose at 10 MHz external noise is typically 55 dB above internal and dipole elements are each connect to a high-impedance preamplifier with a noise figure of 10 dB. Finally, suppose if a 10 dB "cushion" is to be maintained between external and internal noise, i.e., after encountering the array inefficiency and front-end noise figure, the external noise may still dominate internal noise by 10 dB. Then the array at 10 MHz must be designed to have an efficiency of −35 dB, based on these example numbers.

The design equation used for array efficiency is:

$$Eff = \frac{\int_0^{2\pi} d\varphi \int_0^{\pi} d\vartheta \sin(\vartheta)[w_n]^T[g_n(\vartheta, \varphi)]^T[g_n(\vartheta, \varphi)][w_n]}{\int_0^{2\pi} d\varphi \int_0^{\pi} d\vartheta \sin(\vartheta)[g_n(\vartheta, \varphi)][g_n(\vartheta, \varphi)]^T} \quad \text{(Eq. 9)}$$

The meaning of the numerator is the following. It represents the noise power coming from the entire sphere of space from $0 < \vartheta < \pi$ and $0 < \varphi < 2\pi$, equally distributed (i.e., isotropic) after the noise signals pass through the superdirective N-element array and are summed with the selected weights. Thus, it includes noise coming into the main lobe of the array pattern as well as into all of the sidelobes.

The denominator is the noise power into each of the individual antenna array elements from the entire sphere of space, where the power is summed over the N antenna elements. The denominator is bigger than the numerator, because the summing with weights causes most of the incoming noise signal power to cancel. The denominator is the power received on the individual elements before cancellation. One must in general assume the external noise is isotropic, in the absence of other knowledge. If one prefers a different noise distribution that is known, it can be included under both integrals to give a revised efficiency.

For the example at 10 MHz that has been considered, the efficiency should be no worse than −35 dB, i.e., Eff 0.000316, according to the equation −35 dB=10×$Log_{10}$ (0.000316). So using this calculated efficiency, the array may be designed with a certain number of elements, spacing, and weights so that this efficiency is achieved.

Circular Arrays at 10 MHz

To illustrate the dependencies and properties of superdirective circular receive arrays with an odd number of elements, a example of the characteristics of various antenna arrays at 10 MHz is given. It is assumed that an array efficiency of −35 dB is to be achieved in this example. Using the above equations, the physical dimensions and pattern properties of several circular arrays that meet this specified efficiency are examined. Table 1 below highlights these properties.

TABLE 1

| Number of Elements | 3 | 5 | 7 | 9 | 15 |
| --- | --- | --- | --- | --- | --- |
| Radius of Array | 0.12 m | 1.15 m | 3.0 m | 5.7 m | 15.0 m |
| Directive Gain | 10.2 dB | 12.8 dB | 14.6 dB | 15.9 dB | 18.3 dB |
| 3-dB Bearing Beamwidth | ±53.6° | ±30.0° | ±21.9° | ±15.9° | ±9.2° |
| 1st Null Bearings | ±113° | ±65° | ±45° | ±35° | ±19.7° |
| 1st Sidelobe Bearings | ±180° | ±102° | ±74° | ±55° | ±32.3° |
| 1st Sidelobe Levels | −7.5 dB | −9.5 dB | −9.4 dB | −9 dB | −8 dB |

In Table 1, the top row gives the odd number of elements that are arranged symmetrically in a circle. The next row gives the radius of the array in meters that achieves the specified −35 dB efficiency. The superdirective gain is given in the next row; here the array is positioned over a perfect ground plane so that its gain is increased by 3 dB over its free-space gain. The next row gives the bearing beamwidth at the 3-dB points on the beam. The final rows give first bearing null positions, along with the maximum sidelobe bearings and sidelobe levels.

Practical Implementation of the Superdirective Array

Figure 2:
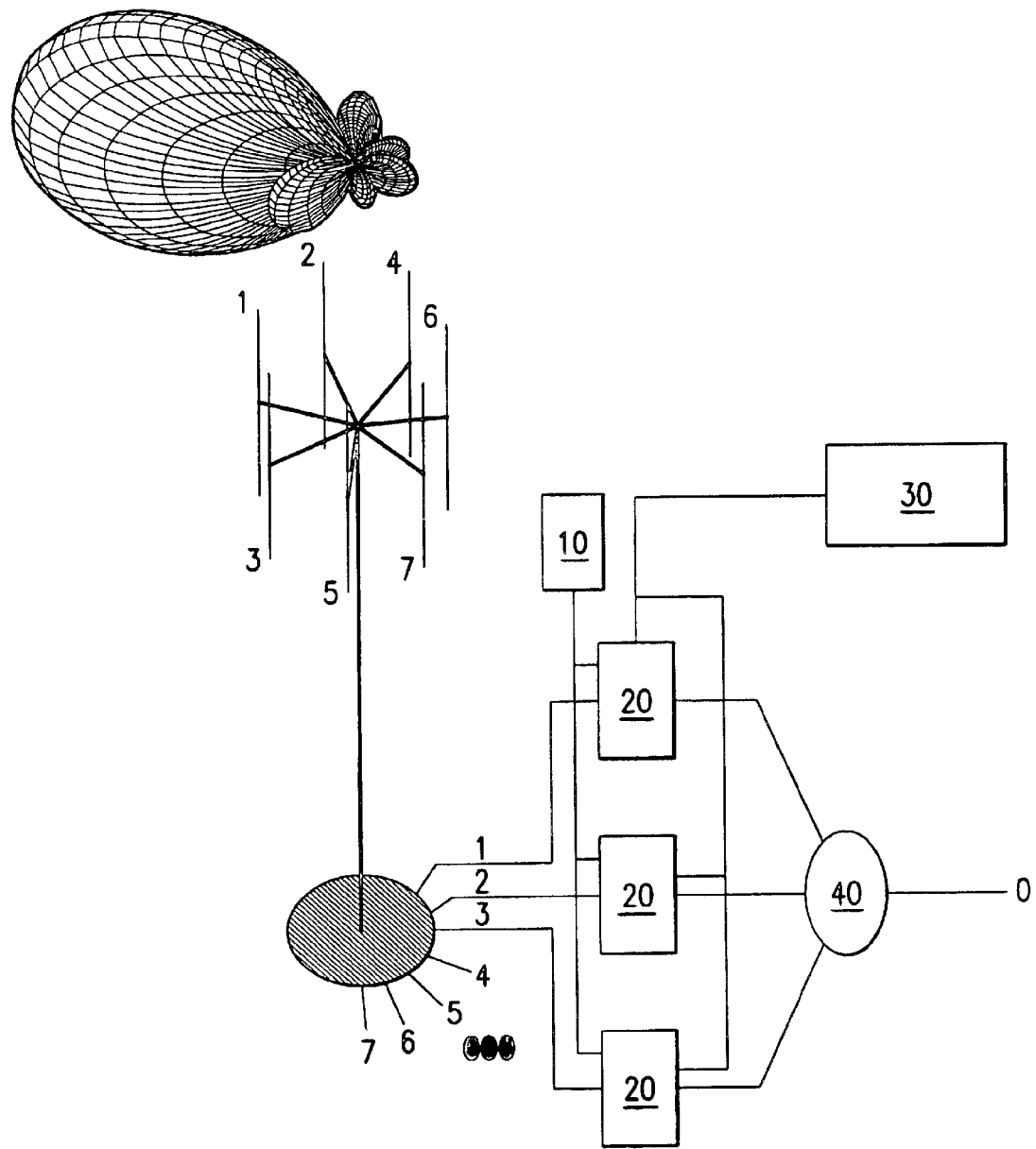
FIG. 2 illustrates an example of a 7-element superdirective circular dipole receive antenna array with the pattern it achieves above it, in accordance with embodiments of this disclosure. Also it shows an exemplary signal-processing block-diagram embodiment that can create and steer this pattern to desired directions.

Referring to FIG. 2, the 7-element circular array shown is considered in this example. Its properties are as described in the middle column of the Table 1. The circular array is shown to be mounted on a post above a ground plane; in one embodiment of the present invention, the mounted array height could be slightly more than a quarter wavelength of the signals being measured. The seven elements are positioned every 360°÷7=51.43° around the circle, with Element #1 located on the x-axis, rotated in this case to the left side of the figure. Weights were calculated with the equations discussed previously to form a beam directed along the x-axis, and the resulting pattern is shown above the antenna sketch. The pattern plots the absolute amplitude of the far-field strength.

An embodiment of the present invention may have high-impedance preamplifiers for each dipole element near the feedpoints. The seven signals from these elements come down the post and—after digitization—have pre-calculated weights applied in processing block 20 by a processor. A processor is any device which performs calculations or mathematical functions. The pre-calculated weights have been stored in memory, block 10. They are based on and indexed to the desired beam steer directions. In addition, they may include the actual array-element antenna patterns measured after installation of the circular array, $g_n(\vartheta, \varphi)$ Finally, the computer of block 30 calculates in real time any amplitude and phase corrections necessary to balance the element signals; these account for any hardware channel parameter drifts caused by time, temperature, aging, etc. Such corrections are obtained from radar echoes that come from the background, such as scatter from the sea surface itself. All of these are applied to the signals digitally, in block 20. From block 20, the seven signals are summed in block 40, to represent the signal O that constitutes the output when the superdirective narrow beam is pointed in direction $\vartheta_o, \phi_o$.

Nulling Overhead Signals

A procedure for use with existing crossed-loop/monopole receive antenna-based coastal radars is shown here. In a system called a SeaSonde® (CODAR Ocean Sensors; Los Altos, Calif.), coastal ocean currents are mapped using MUSIC direction-finding principles (U.S. Pat. No. 5,990, 834, which is incorporated by reference in its entirety) applied to this three-element receive antenna's signals. In this case, the two crossed loops have cosine pattern responses to incoming vertically polarized signals, with their lobes at right angles to each other. The monopole passing through the co-located loops has an omni-directional response. All three elements share the same phase center, yet are geometrically and electrically orthogonal. This configuration has proven very effective for mapping of sea surface currents based on Bragg scatter from the decameter-length ocean waves.

The crossed-loop/monopole arrangement has a severe impediment when target distances exceed 90 km. At HF, an overhead ionospheric E-layer, a layer of the ionosphere between 90 and 200 km in altitude, often specularly reflect strong echoes that mask entire radar range cells. The loops are especially sensitive to these echoes because they do not have a null in the zenith direction. Even a monopole does not produce a perfect vertical null because of nearby obstacles and imperfections (like cables feeding the antenna). Therefore, it would be desirable to: (i) devise a compact three-element antenna that can be mounted on a pole out of reach, similar to the original crossed-loop/monopole unit; (ii) be able to achieve an overhead null at zenith by some combination of the signals from the three elements; (iii) end up with three responses to vertically polarized signals in the horizon plane that are identical to the original crossed-loop system's cosine and omni-directional patterns.

An example of how this is done is shown here, using the same superdirective near-canceling scheme, where three closely spaced vertical dipoles are arranged in a circle. Resembling a triangle, this arrangement on a post is shown in FIG. 3.

Figure 3:
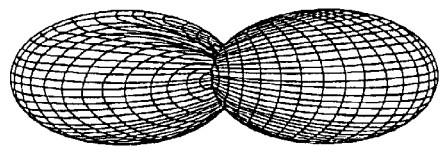
FIG. 3 illustrates techniques by which a circular 3-element dipole receive array produces overhead cancellation—in addition to the dipole null—to eliminate unwanted ionospheric echoes, while simultaneously forming fixed crossed-loop/monopole beam patterns for sea surface monitoring. Three patterns are shown above the antenna. The equations for combining the signals to create the patterns are given for each of the three cases. An exemplary signal-processing block-diagram is shown that can achieve these patterns.
Figure 3:
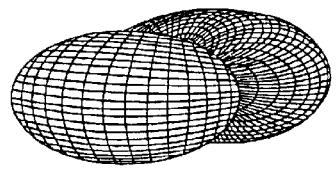
Figure 3:
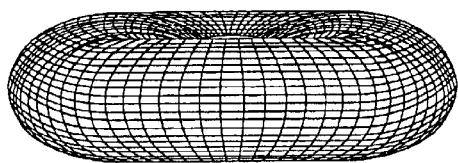
Figure 3:
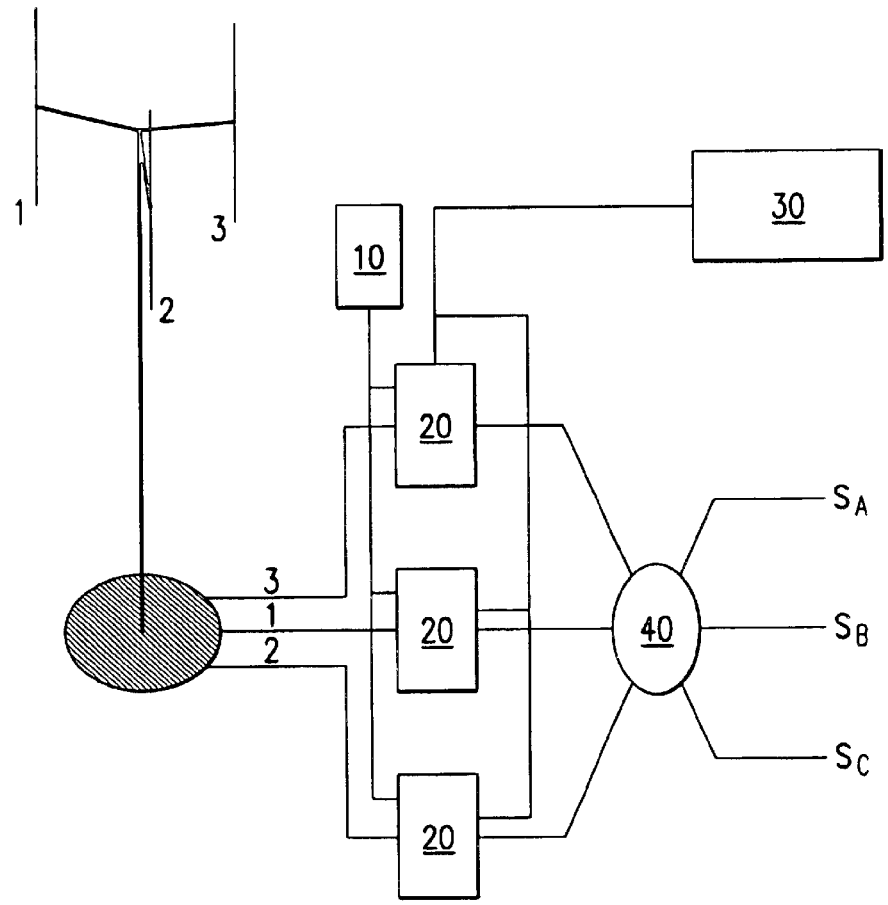

In FIG. 3, the signals from the three individual dipole elements, $V_1$, $V_2$, and $V_3$ pass into block 20. Measured patterns and/or pattern corrections that serve as calibration are stored in memory, block 10, and read out, passing into block 20. Finally, any real-time amplitude and phase adjustment weight factors being calculated from the radar data in the digital computer 30 are also applied in block 20. The output voltages after these adjustments then pass into a summing device, 40, from which the three desired crossed-loop/monopole-resembling signals $S_A$, $S_B$, and $S_C$ are outputted at the right.

Synthesizing crossed-loop/monopole patterns also overcomes a difficulty of other potential zenith-canceling schemes. For instance, suppose one obtained the difference of the signals between adjacent elements: $V_a = V_2 - V_1$; $V_b = V_2 - V_1 V_c = V_1 - V_3$. These new voltage patterns produce array cancellation of overhead signals and three cosine-resembling patterns (for small array radius) at 120° bearing spacings. Unfortunately, these patterns lack the robustness required of the MUSIC DF algorithm to allow resolution of two signals from different directions. The covariance matrix among the synthesized loop signals in this case has "rank-one", meaning only one bearing can be found. The crossed-loop/monopole pattern, on the other hand, produces a covariance matrix of "rank-two", meaning it can handle both single-angle and dual-angle target scenarios.

When the radius to the three elements from center is small (less than a quarter wavelength), the equation that provides an array overhead null as well as crossed-loop/monopole patterns is given below. The signals $S^A$, $S_B$, and $S^C$ are the synthesized patterns of the two crossed loops (A and B) and the monopole (C) respectively. The patterns they produce are shown above the antenna in FIG. 3. As is evident, signals in the overhead direction are deeply suppressed. To reiterate, this is a result of two effects: the natural null of a vertical dipole overhead and the added array null produced by cancellation.

$$S_A = V_1 - \frac{V_2 + V_3}{2}$$
$$S_B = V_2 - V_3$$
$$S_C = V_1 + V_2 e^{+j2\pi/3} + V_3 e^{-j2\pi/3}$$

(Eq. 10–12)

The equations used above and the desired patterns they produce may depend on the assumption of ideal, omni-directional patterns for the individual dipoles. In practice, this assumption may be approximately met. The post, feedlines, and the adjacent antennas themselves may distort the dipole patterns so they are not omni-directional. This can be handled by measuring the array element patterns after installation, and using the post-installation measurements instead in the synthesis procedure outlined here. The equations above will then need multiplicative weights or calibration adjustment correction constants attached to the voltages on the right side of the equation to produce the desired overhead null by accommodating drifts and imperfections.

The measured antenna gain patterns $g_n(\vartheta, \phi)$ are used in the previous equations instead of the idealized dipole patterns to calculated the weights. The actual distorted horizon patterns that result are used in the MUSIC DF algorithm to get bearing, just like the procedure presently used with an actual crossed-loop/monopole patterns that are distorted by the local environment.

It may be desirable to periodically re-calculate the null-producing weights and resulting horizon patterns during radar operations. This will accommodate dnrfts or degradations in the antennas, cabling, and hardware channels. It can also track changing ionospheric conditions that may move the specular reflecting region away from zenith by a few degrees due to layer tilts, allowing the null to follow in the direction of the strongest overhead signal.

The patterns synthesized in this manner and shown in FIG. 3 remain invariant with frequency and/or array radius, as long as the array radius is less than approximately ¼ wavelength. The limit on minimum array radius and desirable compactness follows the same criterion given above. The array efficiency must be kept high enough that external noise dominates over internal noise. For example, Table 1 shows that a 10-MHz three-element element circular array can be as small as 12 cm in radius and still have −35 dB efficiency, which is sufficient to see external noise at that frequency. In reality, a somewhat larger spacing (e.g., 50 cm) is recommended to avoid undesirable effects of severe mutual coupling.

REFERENCES

Each of the following references is hereby incorporated by reference in its entirety.

U.S. Pat. No. 5,990,834
U.S. Pat. No. 5,361,072
U.S. Pat. No. 4,172,255
Barrick, D. E. and M. W. Evans (1979), CODAR: A coastal RF radar for real-time current mapping, U.S. Pat. No. 4,172,255.
Barrick, D. E., B. J. Lipa, P. M. Lilleboe, and J. Isaacson (1994), Gated FMCW DF radar and signal processing for range/Doppler/angle determination, U.S. Pat. No. 5,361,072.
Barrick, D. E., B. J. Lipa (1999), Radar Angle Determination with MUSIC Direction Finding, U.S. Pat. No. 5,990,834.
Harrington, R. F., (1968), Field Computation by Moment Methods, MacMillan Co.: New York, Chapter 10.

We claim:

1. A method for making a superdirective circular receive array with an odd number of elements comprising:
    calculating a minimum array efficiency of the superdirective circular receive array;
    calculating a maximum superdirective gain of the superdirective circular receive array;
    determining an amplitude weight or a phase weight for an array element in the superdirective circular receive array based on the minimum array efficiency and the maximum superdirective gain; and
    determining a number of array elements in the superdirective circular receive array and a radius of the superdirective circular receive array.

2. The method of claim 1, wherein angle spacings between elements of the superdirective circular receive array are equal.

3. The method of claim 1, wherein the array efficiency is determined in accordance with an equation $$Eff = \frac{\int_0^{2\pi} d\varphi \int_0^{\pi} d\vartheta \sin(\vartheta)[w_n]^T [g_n(\vartheta, \varphi)]^T [g_n(\vartheta, \varphi)][w_n]}{\int_0^{2\pi} d\varphi \int_0^{\pi} d\vartheta \sin(\vartheta)[g_n(\vartheta, \varphi)][g_n(\vartheta, \varphi)]^T}$$

where $g_n(\vartheta\varphi)$ is a complex far-field radiation in direction $\vartheta\varphi[w_n]$ is an amplitude/phase weighting of the elements of the superdirective circular receive array, the numerator of the equation representing a noise power coming from a sphere of space from $0<\vartheta<\pi$ and $0<\varphi<2\pi$, and the denominator is a summation of a noise power of each of the elements of the circular array.

4. The method of claim 1, wherein the superdirective gain is determined in accordance with an equation $$G(\vartheta_o, \varphi_o) = \frac{P(\vartheta_o, \varphi_o)}{\int_0^{2\pi} d\varphi \int_0^{\pi} d\vartheta \sin(\vartheta) P(\vartheta, \varphi)}$$

where $P(\vartheta, \varphi)$ is a far-field power, and $G(\vartheta_o, \varphi_o)$ is defined as a directive gain to be maximized in the desired direction $\vartheta_o \varphi_o$, where angles are expressed in a standard spherical coordinate system.

5. The method of claim 4, wherein $P(\vartheta, \varphi)$ is determined in accordance with an equation $$P(\vartheta, \varphi) = \left| \sum_{n=1}^{N} w_n g_n(\vartheta, \varphi) \right|^2 = |[w_n][g_n(\vartheta, \varphi)]^T|^2$$

where $w_n$ is an amplitude/phase weighting for an nth element of the circular array and $g_n(\vartheta, \varphi)$ is a complex far-field radiation in direction $\vartheta, \varphi$ produced by the nth element as determined by a geometrical location of the nth element with respect to a local origin for the circular array.

6. The method of claim 1, wherein an amplitude weight or a phase weight for an array element is determined in accordance with an equation $$[N_{m,n}][w_n] = G_o[D_{m,n}][w_n]$$

where $N_{m,n}$ is determined in accordance with an equation $$N_{m,n}(\vartheta_o, \varphi_o) = [g_m(z, 900_o, \varphi_o)]^T[g_n(\vartheta_o, \varphi_o)]$$

$G_o$ is the superdirective gain, $[w_n]$ is the amplitude weight or the phase weight, and $D_{m,n}$ is determined in accordance with an equation $$D_{m,n} = \int_0^{2\pi} d\varphi \int_0^{\pi} d\vartheta \sin(\vartheta) N_{m,n}(\vartheta, \varphi).$$

7. A method for determining an overhead null in synthesized patterns of received signals of a circular array, comprising
    receiving signals $V_1$, $V_2$, and $V_3$; and
    calculating the synthesized patterns in accordance with the equations $$S_A = V_1 - \frac{V_2 + V_3}{2}$$
$$S_B = V_2 - V_3$$
$$S_C = V_1 + V_2 e^{+j2\pi/3} + V_3 e^{-j2\pi/3},$$

where $S_A$, $S_B$, and $S_C$ are the synthesized patterns.

8. The method of claim 7, further comprising calculating calibration adjustment correction constants for the received signals.

9. An apparatus for an antenna system, comprising
    a plurality of dipole elements located in a circular arrangement of a radius that is less than a detected wavelength to receive a plurality of analog signals, wherein the plurality of dipole elements is an odd number of dipoles;
    an analog-to-digital converter to convert the plurality of analog signals to a plurality of digital signals;
    a first processor configured to calculate amplitude and phase corrections based on a minimum array efficiency and a maximum superdirective gain; and
    a second processor to apply calculated phase and amplitude weights and amplitude and phase corrections to the plurality of digital signals.

10. The apparatus of claim 9, further comprising a memory to store calculated amplitude and phase weights.

11. The apparatus of claim 9, wherein the plurality of short dipoles is 3 dipoles.

12. The apparatus of claim 11, further comprising high-impedance amplifiers coupled to each of the plurality of dipole elements.

13. The apparatus of claim 9, wherein the first processor calculates the amplitude and phase weights.

14. The apparatus of claim 13, wherein the amplitude and phase weights are determined in accordance with an equation $$[N_{m,n}][w_n]=G_o[D_{m,n}][w_n]$$

where $N_{m,n}$ is determined in accordance with an equation $$N_{m,n}(\vartheta_o, \varphi_o)=[g_m(\vartheta_o, \varphi_o)]^T[g_n(\vartheta_o, \varphi_o)]$$

$G_0$ is the superdirective gain, $[w_n]$ is the amplitude weight or the phase weight, and $D,n$ is determined in accordance with an equation $$D_{m,n} = \int_0^{2\pi} d\varphi \int_0^{\pi} d\vartheta \sin(\vartheta) N_{m,n}(\vartheta, \varphi).$$

15. The apparatus of claim 9, wherein the first processor also calculates an overhead null in synthesized patterns of received signals of the antenna system.

16. The apparatus of claim 15, wherein the overhead null is determined in accordance with equation $$S_A = V_1 - \frac{V_2 + V_3}{2}$$
$$S_B = V_2 - V_3$$
$$S_C = V_1 + V_2 e^{+j2\pi/3} + V_3 e^{-j2\pi/3},$$

where $S_A$, $S_B$, and $S_C$ are the synthesized patterns.

17. The apparatus of claim 9, wherein the minimum efficiency as determined in accordance with equation $$E\!f\!f = \frac{\int_0^{2\pi} d\varphi \int_0^{\pi} d\vartheta \sin(\vartheta)[w_n]^T[g_n(\vartheta, \varphi)]^T[g_n(\vartheta, \varphi)][w_n]}{\int_0^{2\pi} d\varphi \int_0^{\pi} d\vartheta \sin(\vartheta)[g_n(\vartheta, \varphi)][g_n(\vartheta, \varphi)]^T}$$

where $g_n(\vartheta, \phi)$ is a complex far-field radiation in direction $\vartheta, \phi$, $[w_n]$ is an amplitude/phase weighting of the elements of the superdirective circular receive array, the numerator of the equation representing a noise power coming from a sphere of space from $0<\vartheta<\pi$ and $0<\phi<2\pi$, and the denominator is a summation of a noise power of each of the elements of the circular array.

18. The apparatus of claim 9, wherein the superdirective gain of the antenna system is determined in accordance with an equation $$G(\vartheta_o, \varphi_o) = \frac{P(\vartheta_o, \varphi_o)}{\int_0^{2\pi} d\varphi \int_0^{\pi} d\vartheta \sin(\vartheta) P(\vartheta, \varphi)}$$

where $P(\vartheta(\phi))$ is a far-field power, and $G(\vartheta_o, \phi_o)$ is defined as a directive gain to be maximized in the descired direction $\vartheta_o, \phi_o$, where angles are expressed in a standard coordinate system.

19. The apparatus of claim 18, wherein $P(\vartheta, \phi)$ is determined in accordance with an equation $$P(\vartheta, \varphi) = \left|\sum_{n=1}^{N} w_n g_n(\vartheta, \varphi)\right|^2 = |[w_n][g_n(\vartheta, \varphi)]^T|^2$$

where $w_n$ is an amplitude/phase weighting for an nth element of the circular array and $g_n(\vartheta, \phi)$ is a complex far-field radiation in direction $\vartheta, \phi$ produced by the nth element as determined by a geometrical location of the nth element with respect to a local origin for the circular array.

20. The apparatus of claim 9, wherein the first and second processors are the same processor.

21. The apparatus of claim 10, wherein the first and second processors and the memory are part of a computing device.

* * * * *

UNITED STATES PATENT AND TRADEMARK OFFICE
CERTIFICATE OF CORRECTION

PATENT NO. : 6,844,849 B1  Page 1 of 3
APPLICATION NO. : 10/617277
DATED : January 18, 2005
INVENTOR(S) : Barrick et al.

It is certified that error appears in the above-identified patent and that said Letters Patent is hereby corrected as shown below:

In claim 3, column 11, line 45, please delete "$g_n(\vartheta, \phi)$" and insert --$g_n(\vartheta, \varphi)$--.

In claim 3, column 11, line 46, please delete "$\vartheta\phi[w_n]$" and insert --$\vartheta,\varphi,[w_n]$--.

In claim 3, column 11, line 50, please delete "$0 < \vartheta < \pi$ and $0 < \phi < 2\delta$" and insert --$0 < \vartheta < \pi$ and $0 < \varphi < 2\pi$--.

In claim 4, column 11, line 61, please delete "$P(\vartheta, \phi)$" and insert --$P(\vartheta, \varphi)$--.

In claim 4, column 11, line 61, please delete "$G(\vartheta_o, \phi_o)$" and insert --$G(\vartheta_o, \varphi_o)$--.

In claim 4, column 11, line 64, please delete "$(\vartheta_o, \phi_o)$" and insert --$(\vartheta_o, \varphi_o)$--.

In claim 5, column 11, line 66, please delete "$P(\vartheta, \phi)$" and insert --$P(\vartheta, \varphi)$--.

In claim 5, column 12, line 7, please delete "$g(\vartheta, \phi)$" and insert --$g(\vartheta, \varphi)$--.

In claim 5, column 12, line 8, please delete "$\vartheta, \phi$" and insert --$\vartheta, \varphi$--.

In claim 6, column 12, line 15, please delete

"$N_{m,n}(\vartheta_o, \phi_o) = [g_m(\vartheta_o, \phi_o)]^T [g_n(\vartheta_o, \phi_o)]$,"

and insert

--$N_{m,n}(\vartheta_o, \varphi_o) = [g_m(\vartheta_o, \varphi_o)]^T [g_n(\vartheta_o, \varphi_o)]$--.

UNITED STATES PATENT AND TRADEMARK OFFICE
CERTIFICATE OF CORRECTION

PATENT NO. : 6,844,849 B1
APPLICATION NO. : 10/617277
DATED : January 18, 2005
INVENTOR(S) : Barrick et al.

It is certified that error appears in the above-identified patent and that said Letters Patent is hereby corrected as shown below:

In claim 14, column 13, line 7, please delete

"$N_{m,n}(\vartheta_o, \phi_o) = [g_m(\vartheta_o, \phi_o)]^T [g_n(\vartheta_o, \phi_o)]$,"

and insert

--$N_{m,n}(\vartheta_o, \varphi_o) = [g_m(\vartheta_o, \varphi_o)]^T [g_n(\vartheta_o, \varphi_o)]$--.

In claim 14, column 13, line 9, please delete "D,n" and insert --$D_{m,n}$--.

In claim 17, column 13, line 37, please delete "$g_n(\vartheta, \Phi)$" and insert --$g_n(\vartheta, \varphi)$--.

In claim 17, column 13, line 37, please delete "$\vartheta, \Phi, [W_n]$" and insert --$\vartheta, \varphi, [W_n]$--.

In claim 17, column 14, line 3, please delete "$0 < \vartheta < \pi$ and $0 < \Phi < 2\pi$" and insert --$0 < \vartheta < \pi$ and $0 < \varphi < 2\pi$--.

In claim 18, column 14, line 15, please delete "$P(\vartheta, \Phi)$" and insert --$P(\vartheta, \varphi)$--.

In claim 18, column 14, line 15, please delete "$G(\vartheta_o, \Phi_o)$" and insert --$G(\vartheta_o, \varphi_o)$--.

In claim 18, column 14, line 17, please delete "$g(\vartheta_o, \Phi_o)$" and insert --$g(\vartheta_o, \varphi_o)$--.

In claim 19, column 14, line 20, please delete "$P(\vartheta, \Phi)$" and insert --$P(\vartheta, \varphi)$--.

UNITED STATES PATENT AND TRADEMARK OFFICE
CERTIFICATE OF CORRECTION

PATENT NO. : 6,844,849 B1
APPLICATION NO. : 10/617277
DATED : January 18, 2005
INVENTOR(S) : Barrick et al.

It is certified that error appears in the above-identified patent and that said Letters Patent is hereby corrected as shown below:

In claim 19, column 14, line 28, please delete "$g_n(\vartheta, \Phi)$" and insert --$g_n(\vartheta, \varphi)$--.

In claim 19, column 14, line 29, please delete "$\vartheta, \Phi$" and insert --$\vartheta, \varphi$--.

Signed and Sealed this

First Day of January, 2008

JON W. DUDAS
*Director of the United States Patent and Trademark Office*